US011189864B2

(12) United States Patent
Shimma

(10) Patent No.: US 11,189,864 B2
(45) Date of Patent: Nov. 30, 2021

(54) ELECTRONIC DEVICE AND CONTROL METHOD

(71) Applicant: CANON KABUSHIKI KAISHA, Tokyo (JP)

(72) Inventor: Naoki Shimma, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/592,922

(22) Filed: Oct. 4, 2019

(65) Prior Publication Data

US 2020/0112068 A1    Apr. 9, 2020

(30) Foreign Application Priority Data

Oct. 5, 2018  (JP) .............................. JP2018-190311

(51) Int. Cl.
*H01M 10/44* (2006.01)
*H02J 7/00* (2006.01)

(52) U.S. Cl.
CPC ............. *H01M 10/44* (2013.01); *H02J 7/007* (2013.01)

(58) Field of Classification Search
None
See application file for complete search history.

(56) References Cited

U.S. PATENT DOCUMENTS

| | | | |
|---|---|---|---|
| 5,790,876 A | 8/1998 | Shima et al. | |
| 5,944,827 A | 8/1999 | Shima et al. | |
| 6,774,604 B2 * | 8/2004 | Matsuda | G06F 1/263 320/110 |
| 7,489,339 B2 * | 2/2009 | Ito | H04N 1/00278 348/207.2 |
| 8,102,466 B2 * | 1/2012 | Matsushima | H04N 1/00915 348/372 |
| 8,385,986 B2 * | 2/2013 | Kim | H04M 1/72403 455/574 |
| 9,438,058 B2 | 9/2016 | Degura et al. | |
| 9,665,150 B2 * | 5/2017 | Sakashita | G06F 1/266 |
| 10,148,112 B2 * | 12/2018 | Nunez | H02J 7/0045 |
| 10,691,555 B2 * | 6/2020 | Hashimoto | G06F 11/1466 |
| 10,714,964 B2 * | 7/2020 | Atkinson | H02J 7/0047 |
| 2011/0063649 A1 * | 3/2011 | Komatsu | G06F 1/3284 358/1.14 |
| 2012/0140112 A1 * | 6/2012 | Matsushima | H04N 5/77 348/372 |
| 2017/0103235 A1 | 4/2017 | Shimma | |
| 2019/0232681 A1 * | 8/2019 | Oguchi | B41J 3/36 |
| 2019/0250689 A1 * | 8/2019 | Ivanov | H02J 1/14 |

FOREIGN PATENT DOCUMENTS

JP       08-221163 A     8/1996
WO   WO-2017171735 A1 *  10/2017  .............. H02J 7/007

* cited by examiner

*Primary Examiner* — Leigh M Garbowski
(74) *Attorney, Agent, or Firm* — Cowan, Liebowitz & Latman, P.C.

(57) ABSTRACT

An electronic device includes an interface unit that receives power from an external device, a charging unit that charges a battery with power received from the external device via the interface unit, and a control unit that stops operations of units excluding the interface unit and the charging unit, when the charging unit charges the battery with the power received from the external device via the interface unit and a predetermined function is selected.

15 Claims, 10 Drawing Sheets

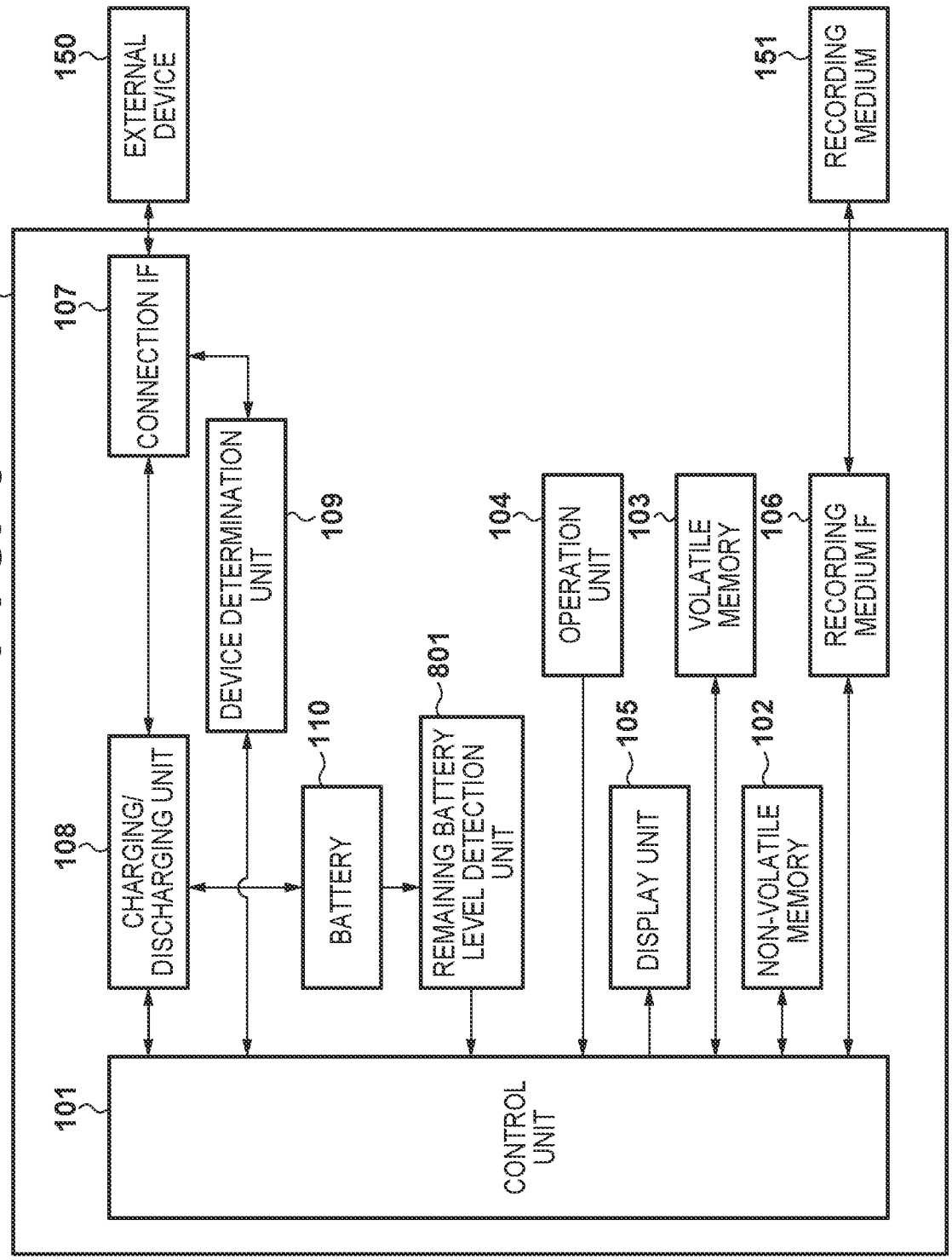

ELECTRONIC DEVICE AND CONTROL METHOD

BACKGROUND

Field of the Disclosure

Aspects of the disclosure generally relate to electronic devices powered by batteries, control methods thereof, or the like.

Description of the Related Art

Digital cameras, smartphones, or the like are examples of electronic devices that can operate using battery packs containing rechargeable batteries such as lithium-ion batteries. By connecting a Universal Serial Bus (USB) cable and supplying power to such an electronic device over USB, the electronic device can be operated, and furthermore, the battery pack can be charged with the excess power.

An electronic device that can receive power supplied over USB in this manner first supplies the received power preferentially to components which the electronic device needs to operate, and then uses the excess power to charge the battery pack. Accordingly, reducing the power consumed by the electronic device is essential in order to shorten the time required to charge the battery pack.

Japanese Patent Laid-Open No. 08-221163 discloses a method in which an electronic device is caused to transition to a power saving mode by referring to a bus terminal voltage.

However, according to the method proposed by Japanese Patent Laid-Open No. 08-221163, control is not carried out in accordance with the type of the connected device. It may therefore be impossible for the electronic device to be controlled according to the USB standard when being supplied with power. Furthermore, according to the stated method, control is not carried out in accordance with the purpose of use of the connected device, which means that the electronic device may transition to the power saving mode at a timing not intended by the user.

SUMMARY

According to an aspect of the embodiments, a device, method, or the like capable of appropriately reducing the time required to charge a battery are provided.

According to an aspect of the embodiments, there is provided an electronic device comprising: an interface unit that receives power from an external device; a charging unit that charges a battery with power received from the external device via the interface unit; and a control unit that stops operations of units excluding the interface unit and the charging unit, when the charging unit charges the battery with the power received from the external device via the interface unit and a predetermined function is selected.

According to an aspect of the embodiments, there is provided a method comprising: causing an interface unit of the electronic device to receive power from an external device; causing a charging unit of the electronic device to charge a battery with power received from the external device via the interface unit; and stopping operations of units excluding the interface unit and the charging unit, when the charging unit charges the battery with the power received from the external device via the interface unit and a predetermined function is selected.

According to an aspect of the embodiments, there is provided a non-transitory storage medium storing a program that causes a computer to execute a method, the method comprising: causing an interface unit of the electronic device to receive power from an external device; causing a charging unit of the electronic device to charge a battery with power received from the external device via the interface unit; and stopping operations of units excluding the interface unit and the charging unit, when the charging unit charges the battery with the power received from the external device via the interface unit and a predetermined function is selected.

Further aspects of the embodiments will become apparent from the following embodiments.

BRIEF DESCRIPTION OF THE DRAWINGS

FIG. 8 is a block diagram illustrating an example of components of an electronic device 800 according to a fifth embodiment.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

First, an example of components in an electronic device 100 according to a first embodiment will be described with reference to FIG. 1. However, the components of the electronic device 100 according to the first embodiment are not limited to the components illustrated in FIG. 1. Additionally, the electronic device 100 is not limited to a digital camera or a smartphone, and may instead be a mobile terminal that runs on battery power (e.g., a tablet terminal), or a device that operates as at least one of these.

Figure 1:
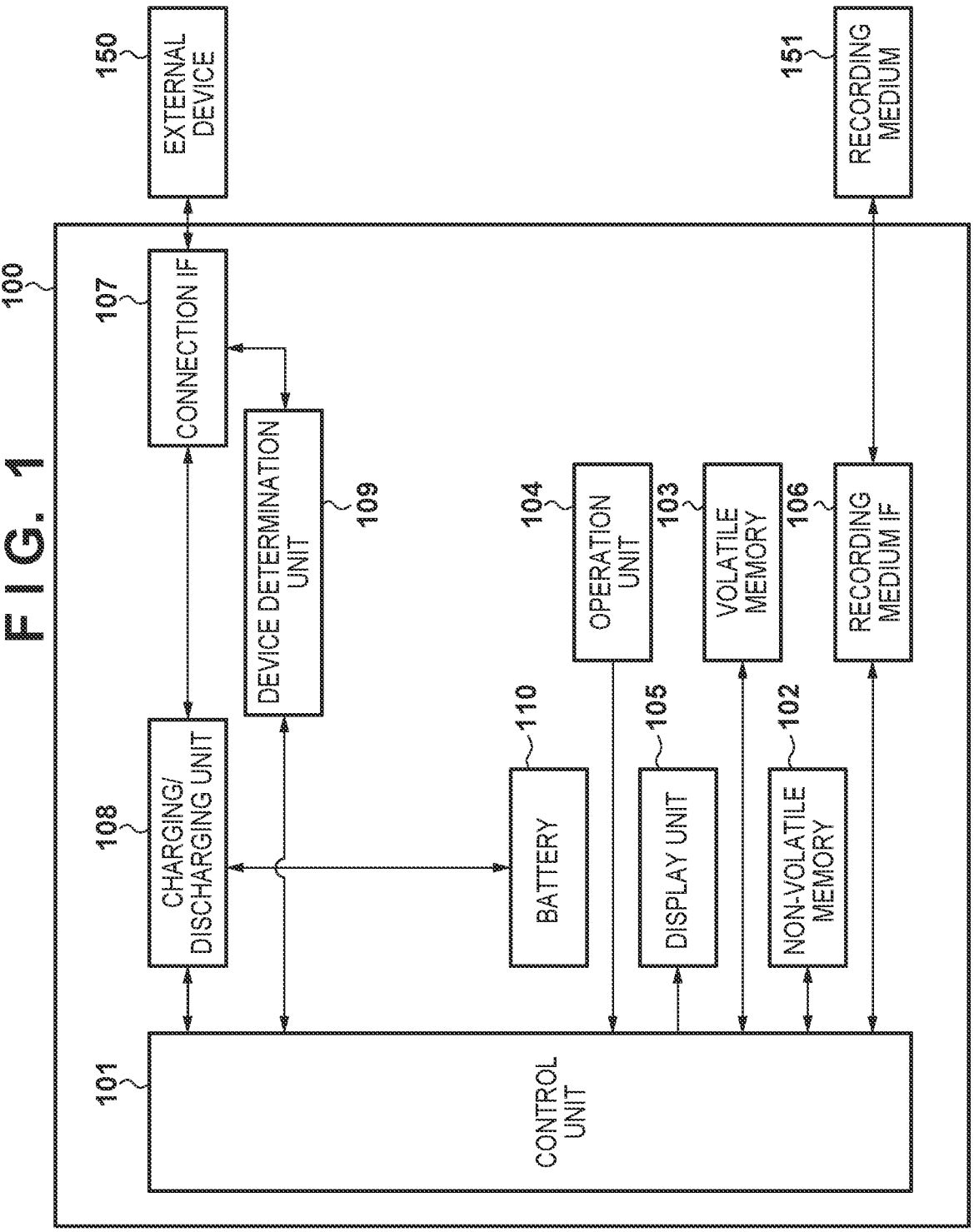
FIG. 1 is a block diagram illustrating an example of components of an electronic device 100 according to a first embodiment.

FIG. 1 is a block diagram illustrating an example of the components of the electronic device 100 according to the first embodiment.

A control unit 101 includes a Central Processing Unit (CPU) or a Micro Processing Unit (MPU) that controls the components of the electronic device 100. The control unit 101 realizes control processes (described later) by executing programs stored in a non-volatile memory 102 (also described later). Note that a hardware may control the overall device by sharing processes rather than the control unit 101 controlling the overall device.

The non-volatile memory 102 is memory that can be recorded to and erased electrically. A hard disk, EEPROM, or the like is used, for example. Constants, programs, or the like for the operation of the control unit 101 are recorded in the non-volatile memory 102. "Programs" refers to programs for executing the processes according to the first to sixth embodiments, which will be described hereinafter.

Volatile memory 103 includes Random Access Memory (RAM). The volatile memory 103 is used as a work area where constants, variables, programs, or the like for the operation of the control unit 101 are deployed. The volatile memory 103 is also used as buffer memory for temporarily holding data received from an external device 150 or data to be sent to the external device 150, and as image display memory for a display unit 105. The volatile memory 103 is furthermore used as a region for saving parameters or the like pertaining to connection processes carried out by a connection interface 107.

An operation unit 104 is constituted by operation members such as various types of switches, buttons, a keyboard, a mouse, and so on which accept various types of operations from a user. A touch panel that is integrated with the display panel of the display unit 105 is also included in the operation unit 104.

The display unit 105 displays images, as well as a graphical user interface (GUI) containing text, graphics, symbols, or the like for performing interactive operations. The display unit 105 is, for example, a display device such as a liquid crystal display or organic EL display. The display unit 105 may be configured as an integrated part of the electronic device 100, or may be an external device connected to the electronic device 100. It is sufficient for the electronic device 100 to be capable of connecting to the display unit 105 and having a function for controlling the display in the display unit 105.

A recording medium interface (IF) 106 is an interface with a recording medium 151 such as a memory card, an optical disk, a hard disk, or the like. The recording medium interface 106 reads out data from the recording medium 151 and writes data into the recording medium 151 under the control of the control unit 101.

The connection interface 107 is an interface for connecting to the external device 150. The electronic device 100 according to the first embodiment can exchange data with the external device 150 through the connection interface 107. The connection interface 107 also supplied power, received from the external device 150, to a charging/discharging unit 108. In the first embodiment, the connection interface 107 is compliant with Universal Serial Bus (USB) Type-C standard and USB Power Delivery standard (called the "USB PD standard" hereinafter). The connection interface 107 includes a VBUS terminal, a D+ terminal, a D− terminal, a Configuration Channel (CC) terminal, and a GND terminal, with the CC terminal and the GND terminal connected by a resistor to pull-down the CC terminal with a predetermined resistance value defined by the standard. The VBUS terminal is a terminal for receiving a power supply from a connected device. The D+ terminal and the D− terminal are terminals for exchanging data with the connected device. The CC terminal is a terminal compliant with the USB Type-C standard, and is a terminal capable of acquiring information pertaining to the power supply capability of the external device 150. According to the USB Type-C standard, the power supply from the VBUS terminal can be received when the CC terminal is pulled down. Thus as will be described later with reference to step S206 in FIG. 2, when the connected device is compliant with the USB Type-C standard, stopping (shutting down) the operations of some or all of the components aside from those necessary for charging the electronic device 100 makes it possible to shorten the charging time. Although interfaces compliant with the USB Type-C standard have other terminals as well, they are not needed to describe the embodiments and will therefore not be mentioned here.

A device determination unit 109 receives type information of the external device 150 through the connection interface 107, and determines the type of the external device 150 connected to the connection interface 107. A personal computer ("PC" hereinafter), a USB charger, a printer, and so on are conceivable as types of connected devices. The control unit 101 determines whether or not to charge the connected device, and the charging conditions, in accordance with the type of the device, and then charges a battery 110 by controlling the charging/discharging unit 108. The type information of the external device 150 is information indicating, for example, a Downstream-Facing Port (DFP), an Upstream-Facing Port (UFP), or a Dual-Role Port (DRP) according to the USB Type-C standard. The type information of the external device 150 is furthermore information indicating, for example, a Standard Downstream Port (SDP), a Charging Downstream Port (CDP), or a Dedicated Charging Port (DCP) according to the USB Battery Charging Specification standard.

The charging/discharging unit 108 charges the battery 110, and discharges the battery 110 to supply power to at least the control unit 101. The charging/discharging unit 108 receives power supplied from the external device 150 through the connection interface 107, and supplies power to the control unit 101 preferentially when it is necessary for the control unit 101 to operate. The battery 110 is charged by supplying the excess power to the battery 110. Furthermore, the charging/discharging unit 108 has a function for receiving the power supply from the battery 110 and controlling the amount of power supplied to the control unit 101 when the amount of power required by the control unit 101 exceeds the amount of power that can be obtained from the external device 150, or when the external device 150 is not connected.

The battery 110 is a rechargeable battery such as a lithium-ion battery. Note that the external device 150 and the recording medium 151 are not included in the components of the electronic device 100 according to the first embodiment.

An example of a process carried out by the electronic device 100 according to the first embodiment will be described next with reference to the flowchart in FIG. 2. A process 200 is an example of a process through which the electronic device 100 controls the power supplied to a device connected over USB in accordance with the type of the connected device.

Figure 2:
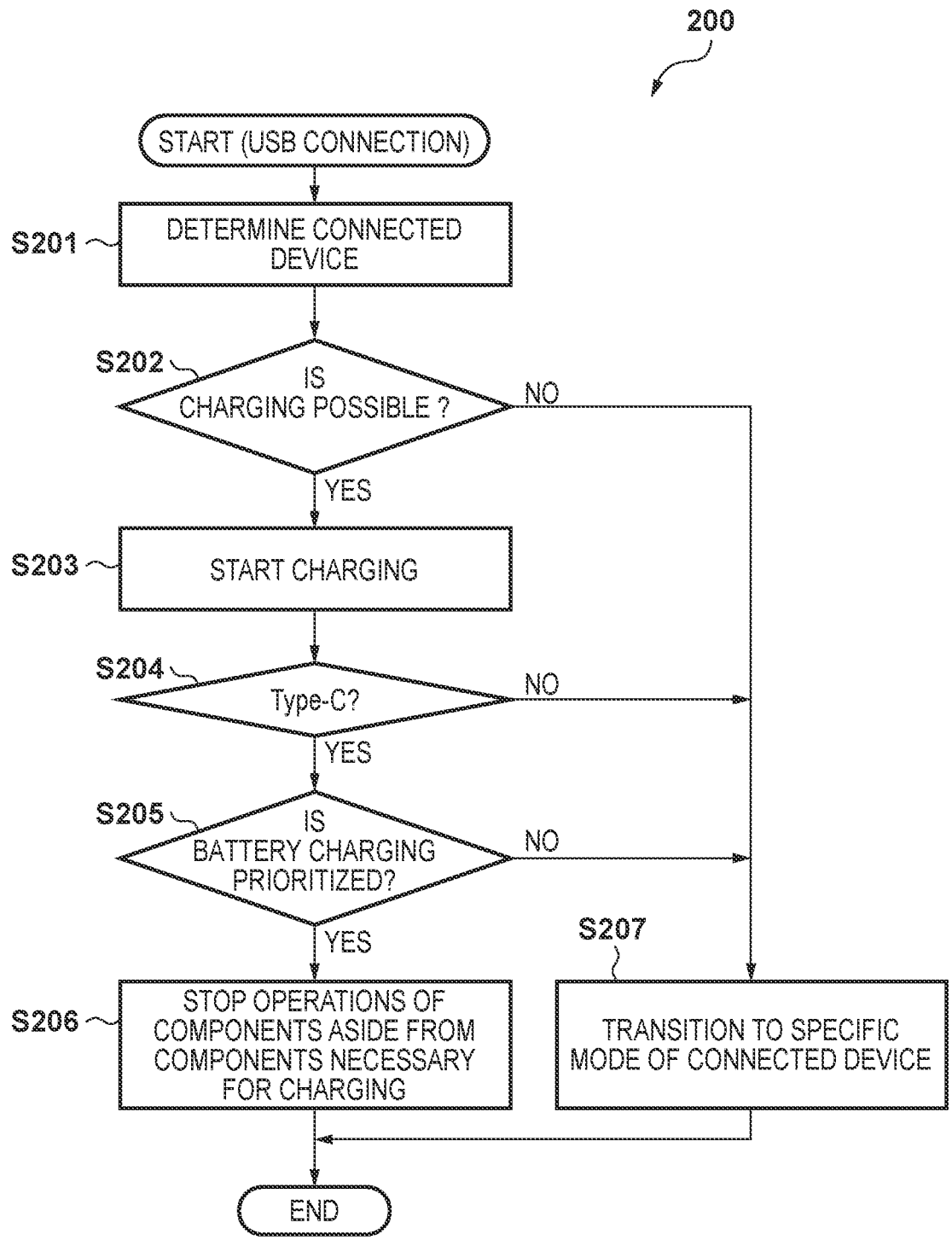
FIG. 2 is a flowchart illustrating an example of operations by the electronic device 100 according to the first embodiment.

The process 200 in FIG. 2 is controlled by the control unit 101 executing a program stored in the non-volatile memory 102. The process 200 is started when the user connects the external device 150 to the connection interface 107.

In step S201, when the external device 150 is connected to the connection interface 107, the device determination unit 109 determines the type of the external device 150. This determination is made by determining the signal at least one of the VBUS terminal, the D+ terminal, the D− terminal, and the CC terminal according to the USB standard. It is further possible to use the CC terminal to determine whether the external device 150 corresponds to a Downstream-Facing Port (DFP), an Upstream-Facing Port (UFP), or a Dual-Role Port (DRP). Here, DFP indicates a device that supplies power, UFP indicates a device that receives power, and DRP indicates a device that can function as both a DFP and a UFP. All of these are defined in the USB Type-C standard. After the type of the external device 150 has been determined in step S201, the process 200 advances to step S202.

In step S202, the control unit 101 uses the result of determining the type of the device in step S201 to determine whether or not charging of the battery 110 is possible. If, for example, the external device 150 is a DFP or a DRP, power can be supplied. Thus in such a case, it is determined that charging of the battery 110 is possible. If it is determined in step S202 that charging of the battery 110 is possible (YES in step S202), the process 200 advances to step S203.

In step S203, the control unit 101 controls the charging/discharging unit 108 to start charging the battery 110, and the process 200 then advances to step S204.

In step S204, the control unit 101 determines whether or not the external device 150 is compliant with the USB Type-C standard. This determination is made using the order in which voltages are applied to the VBUS terminal and the CC terminal in a USB device not compliant with the USB Type-C standard (called a "legacy device" hereinafter) and a device compliant with the USB Type-C standard (called a "Type-C device" hereinafter), for example. Specifically, when connected to a legacy device, a voltage is constantly applied to the VBUS terminal. However, when connected to a Type-C device, a voltage is first applied to the CC terminal, and once the CC terminal has been pulled down with resistance having the predetermined value, the voltage is then applied to the VBUS terminal. The device determination unit 109 determines whether the device is a legacy device or a Type-C device by monitoring the order in which voltages are applied to the terminals in this manner. If in step S204 the external device 150 is determined to be a Type-C device (YES in step S204), the process 200 advances to step S205.

Figure 3A:
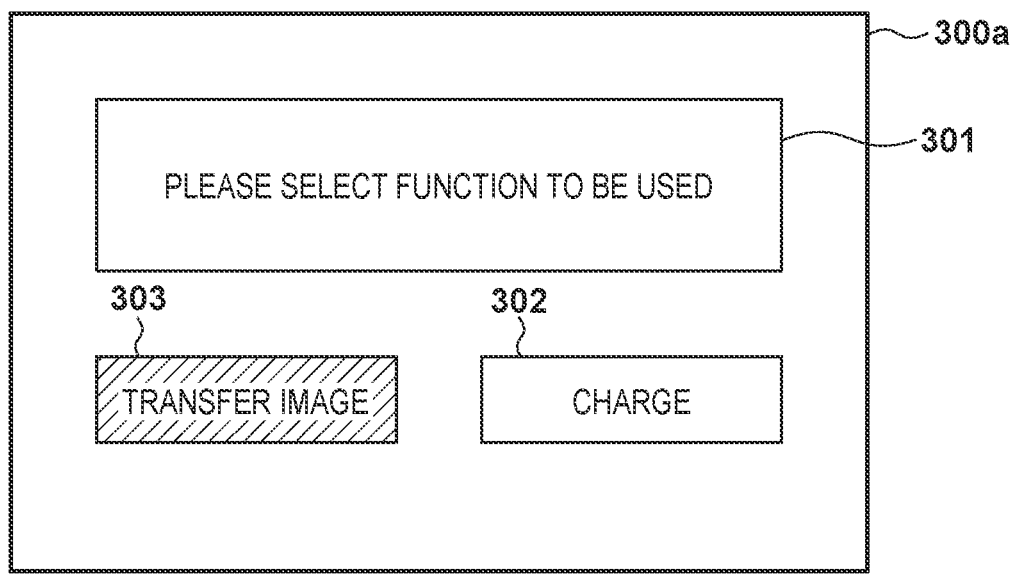
FIGS. 3A and 3B are diagrams illustrating examples of screens displayed by the electronic device 100 according to the first embodiment.

In step S205, the control unit 101 inquires with the user as to the purpose of use of the external device 150, and determines whether or not to prioritize charging of the battery 110. Regarding the inquiry method, if the external device 150 is a PC, for example, a function selection screen 300a such as that illustrated in FIG. 3A is displayed in the display unit 105, and a message 301 for allowing the user to select the purpose of use of the external device 150 (the function the user wishes to use) is displayed. The user can select the purpose of use of the external device 150 by checking the function selection screen 300a and operating the operation unit 104. If the control unit 101 determines that "CHARGE" 302 has been selected in the function selection screen 300a and charging of the battery 110 is therefore prioritized (YES in step S205), the process 200 advances to step S206.

In step S206, the control unit 101 stops the operations of some or all of the components aside from those necessary for charging, in order to shorten the charging time for the battery 110. Some or all of the components aside from the connection interface 107 and the charging/discharging unit 108 are conceivable as the components for which operations are to be stopped, for example. If the connection interface 107 and the charging/discharging unit 108 can operate after the charging has been started in step S203, it is possible to continue charging the battery 110. Some or all of the components, including the control unit 101, can therefore be stopped. Accordingly, the power required by the components whose operations have been stopped can instead be used to charge the battery 110, and thus the charging time can be shortened. The process 200 advances to step S207 if charging of the battery 110 is not possible (NO in step S202), the external device 150 is a legacy device (NO in step S204), or the purpose of use is not charging (NO in step S205). Note that the condition for making a determination of "NO" in step S205 is that the user has selected a function aside from "CHARGE" 302 ("TRANSFER IMAGE" 303) in the function selection screen 300a illustrated in FIG. 3A.

Figure 3B:
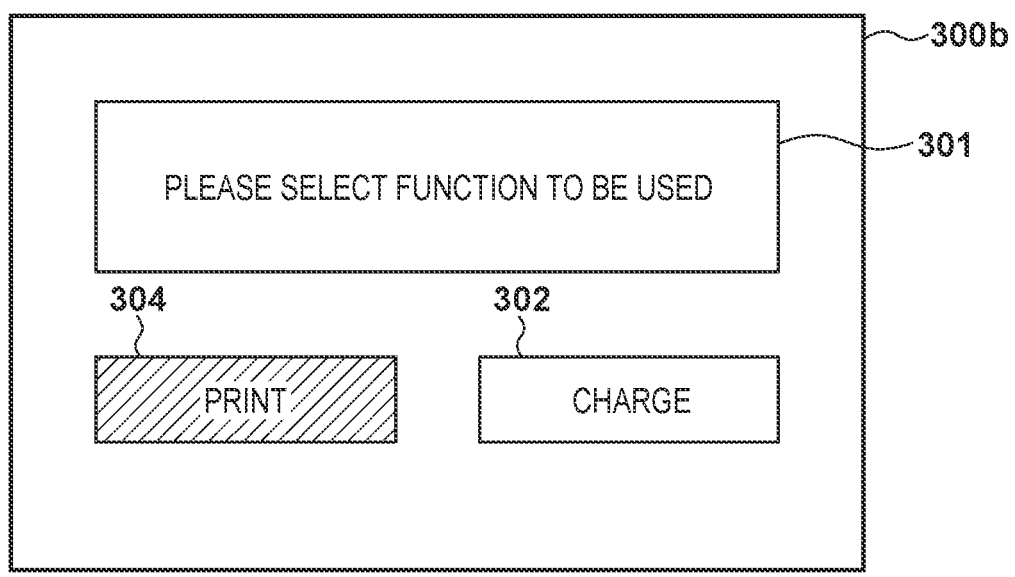

In step S207, the control unit 101 transitions to a dedicated mode in accordance with the type of the external device 150 (called a "device-specific mode" hereinafter), and provides the user with a function based on the type of the device. If the external device 150 is a PC, for example, the function provided to the user is a process for transferring image data recorded in the non-volatile memory 102 or the recording medium 151 to the PC. If the external device 150 is a printer, a function selection screen 300b such as that illustrated in FIG. 3B is displayed in the display unit 105 in step S205, and the message 301 for allowing the user to select the purpose of use of the external device 150 (the function the user wishes to use) is displayed. Furthermore, in step S207, a function for sending image data recorded in the non-volatile memory 102 or the recording medium 151, and print settings data for configuring the printing method, to the printer, is provided. When the external device 150 is a printer, too, the condition for making a determination of "NO" in step S205 is that the user has selected a function aside from "CHARGE" 302 ("PRINT" 304) in the function selection screen 300b illustrated in FIG. 3B. If the external device 150 is a dedicated charging device such as a USB charger, it is highly likely that the user's purpose of use is charging. Thus in such a case, step S206 may be executed assuming that the user has selected "charging", without displaying the function selection screens 300a and 300b illustrated in FIGS. 3A and 3B in step S205.

If the external device 150 is a legacy device, it is necessary for the electronic device 100 to continually response to communication requests from the external device 150 while receiving the power supply. It is therefore necessary to operate the control unit 101, the non-volatile memory 102, which is a storage region for the programs required by the control unit 101 to operate, and the volatile memory 103, which is work memory for executing programs, in order to make the communication responses. Thus step S206 in FIG. 2 cannot be executed, in order to satisfy the conditions of the USB standard. On the other hand, with the USB Type-C standard, power can be received without responding to communication requests if the CC terminal is pulled down with resistance having the predetermined value. As such, the components required for responding to communication requests need not be operated, and it is sufficient to operate only the components necessary for charging the battery 110. This makes it possible to maintain compatibility with the USB standard when connecting even legacy devices, while also shortening the charging time for the battery 110 by suppressing power consumption by the electronic device 100 when a Type-C device is connected.

According to the first embodiment as described thus far, the charging time for the battery 110 of the electronic device 100 can be shortened when a USB Type-C device is connected. Furthermore, because the electronic device 100 is controlled in accordance with the purpose of use of the connected device, it is easier for the user to activate his/her desired functions, which makes it possible to improve the usability.

Second Embodiment

In the first embodiment, it is possible that the user wishes to reduce the burden involved in the operations for selecting a function by fixing the function activated when a device is connected. Thus according to a second embodiment, a screen 400a such as that illustrated in FIG. 4A, for example, is displayed in the display unit 105 in step S205 of FIG. 2, instead of the function selection screen 300a illustrated in FIG. 3A, when the external device 150 is first connected. Note that components of the electronic device according to the second embodiment are the same as in the electronic device 100 according to the first embodiment. In the screen 400a illustrated in FIG. 4A, the selection items 301 to 303 are the same as the selection items 301 to 303 in the screen 300a illustrated in FIG. 3A. A selection item 401 is a selection item for fixing the function activated when the external device 150 is connected the next and subsequent times. When the user wishes to fix the function activated when the external device 150 is connected the next and subsequent times, he or she may check the selection item 401 in the screen 400b illustrated in FIG. 4B, and then select the function to be used from selection items 302 and 303 in the screen 400c illustrated in FIG. 4C. In this case, the display appearance of the selection item 401 may be changed to indicate that the item has already been selected, as indicated in FIG. 4B. The screen 400c illustrated in FIG. 4C indicates an example in which the user has selected "CHARGE" 302 for the battery 110. After the necessary item has been selected in the screen 400a illustrated in FIG. 4A, the control unit 101 records information of the function to be activated when the external device 150 is connected (called "activate function information" hereinafter) into the non-volatile memory 102. The control unit 101 confirms whether the activate function information is recorded in the non-volatile memory 102 the next and subsequent times the external device 150 is connected. If the activate function information is recorded, the process 200 advances to step S206 or step S207 on the basis of the recorded activate function information, without the function selection screens 300a and 300b illustrated in FIGS. 3A and 3B being displayed in step S205. For example, if the user has selected "CHARGE" 302 for the battery 110 as the function as indicated by the screen 400c illustrated in FIG. 4C, the process 200 advances to step S206 the next and subsequent times the external device 150 is connected. However, the process 200 advances to step S207 if a determination of "NO" has been made in steps S202 and S204 prior to the determination made in step S205.

Although the second embodiment describes an example in which the external device 150 is a PC, the embodiment functions the same even when the external device 150 is a printer. In this case, the selection item 401 indicated in the screen 400a illustrated in FIG. 4A is added to the screen 300b illustrated in FIG. 3B, and the function that is activated by the control unit 101 is controlled in response to the user's selection operation.

Additionally, rather than depending on the type of the external device 150, the activate function information may be recorded with common settings so that the external devices operate with the same settings. Alternatively, the activate function information may be recorded separately for each type of external device 150, with the activated function being changed for each type of device.

Third Embodiment

Figure 4A:
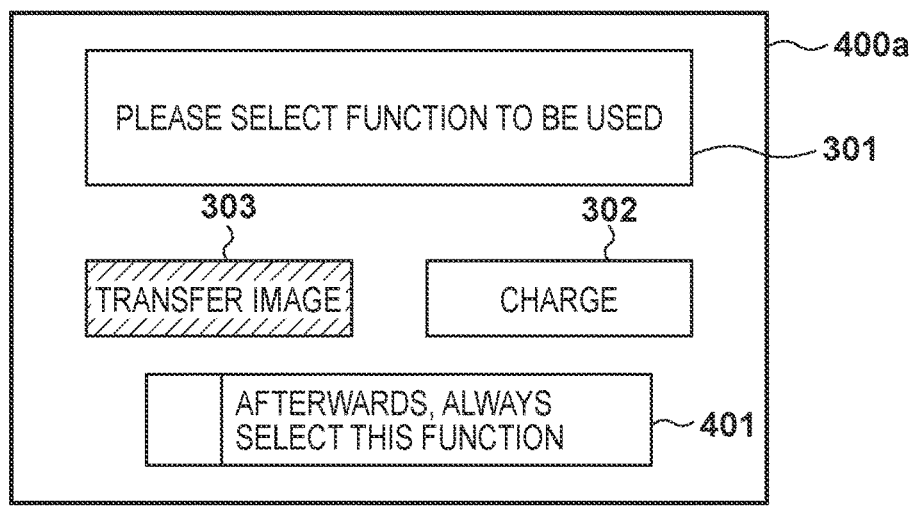
FIGS. 4A to 4C are diagrams illustrating examples of screens displayed by the electronic device 100 according to a second embodiment.
Figure 4B:
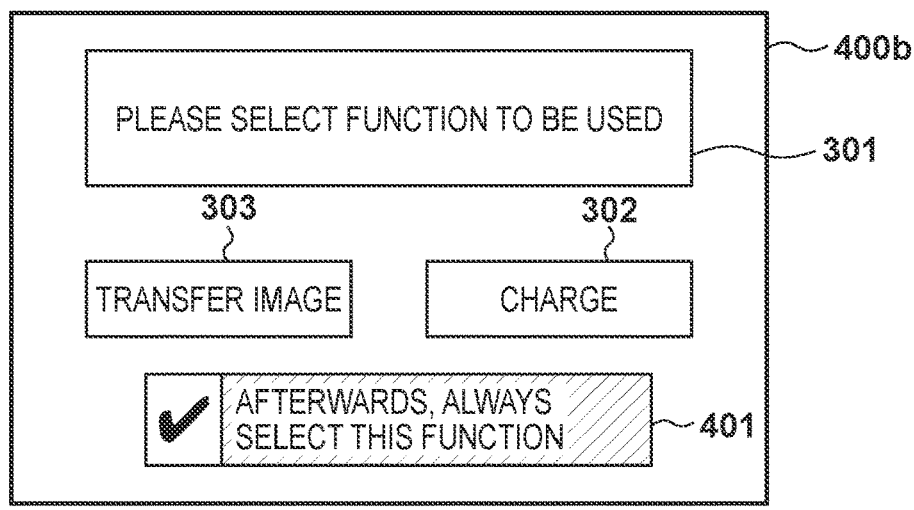
Figure 4C:
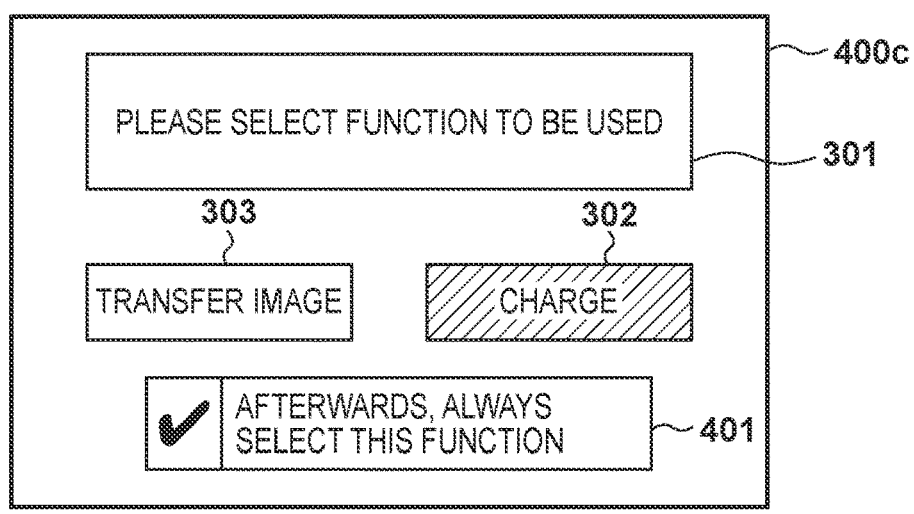

In the first embodiment and the second embodiment, the purpose of use of the external device 150 is confirmed by displaying the function selection screens 300a and 300b illustrated in FIGS. 3A and 3B, or the function selection screen 400a illustrated in FIG. 4A, and having the user select the function to be used when the external device 150 is connected in step S205 of the process 200. However, according to a third embodiment, the user is given the ability to change settings for the operating mode of the electronic device 100 in advance, and the purpose of use is determined on the basis of setting information. For example, the user can display a settings screen in the display unit 105 and change the settings for the operating mode of the electronic device 100 by operating the operation unit 104.

Note that components of the electronic device according to the third embodiment are the same as in the electronic device 100 according to the first embodiment.

Figure 5A:
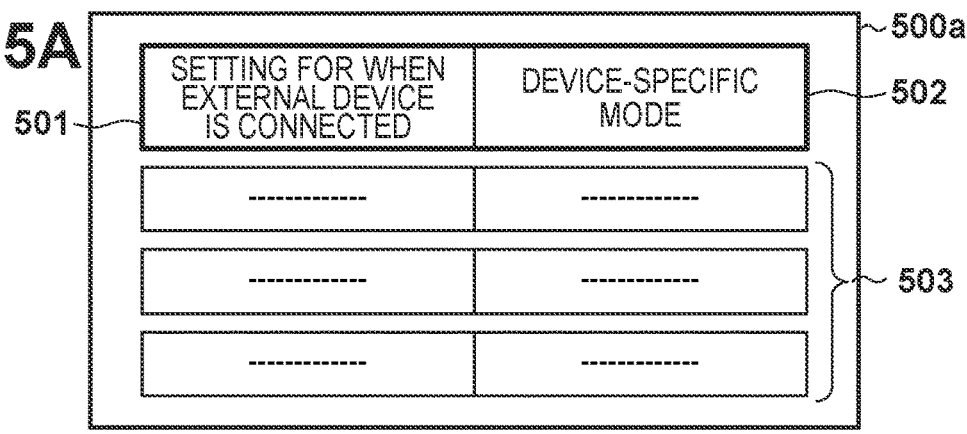
FIGS. 5A to 5D are diagrams illustrating examples of screens displayed by the electronic device 100 according to a third embodiment.
Figure 5B:
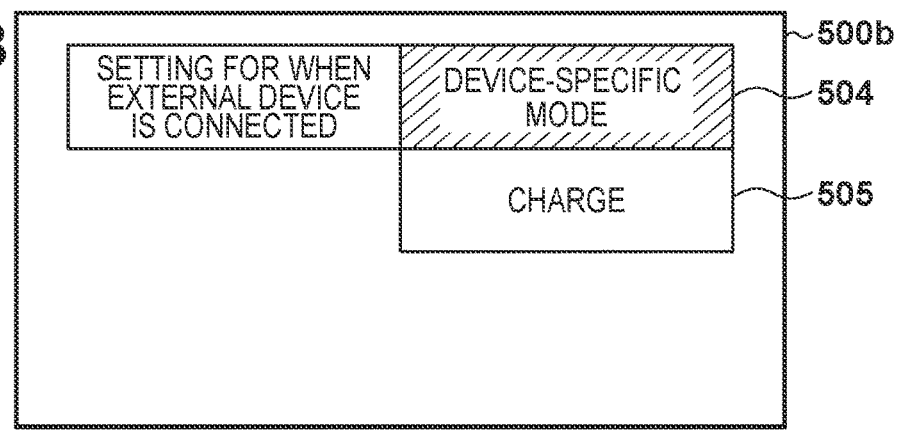
Figure 5C:
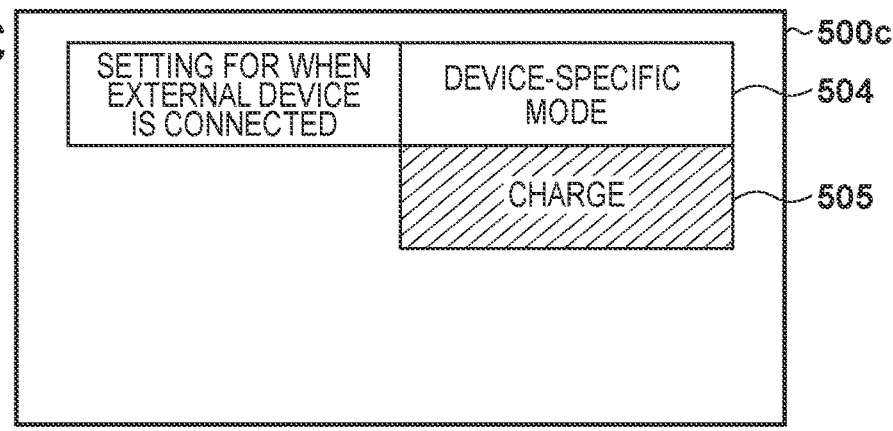
Figure 5D:
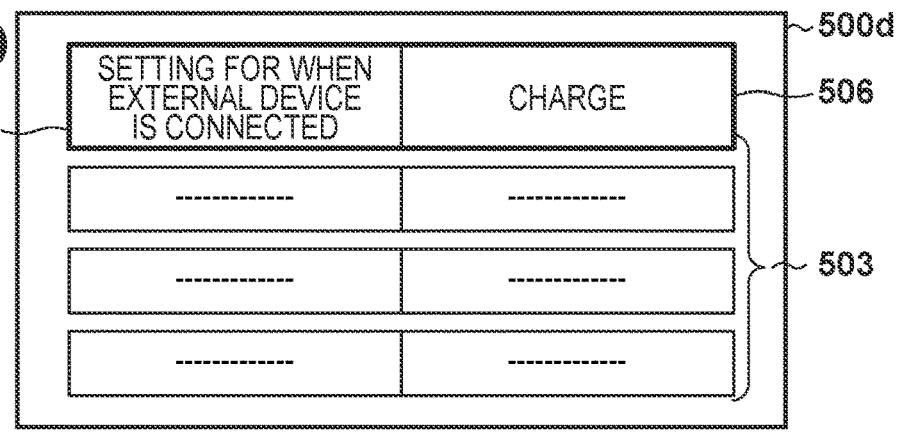
Figure 6:
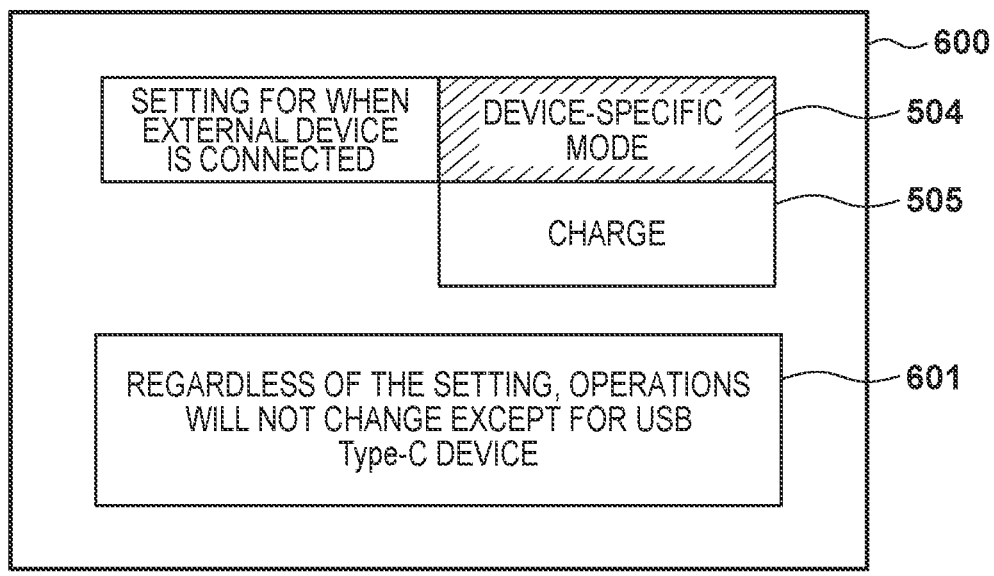
FIG. 6 is a diagram illustrating an example of a screen displayed by the electronic device 100 according to the third embodiment.

FIGS. 5A to 5D are diagrams illustrating an example of a method for switching the settings of an operating mode started when the external device 150 is connected from the device-specific mode to charging the battery 110. A settings screen 500a such as that illustrated in FIG. 5A is displayed in the display unit 105 in response to the user operating the operation unit 104. A setting item 501 for the operating mode started when the external device 150 is connected, and the device-specific mode 502, are displayed in the settings screen 500a of FIG. 5A. In addition to the setting items 501 and 502, various setting items 503 for changing the operating mode of the electronic device 100 may be displayed in the settings screen 500a illustrated in FIG. 5A. Next, when the user operates the operation unit 104 and selects the setting item 501 for when an external device is connected, a function selection screen 500b such as that illustrated in FIG. 5B is displayed in the display unit 105. The device-specific mode 504 set in the settings screen 500a illustrated in FIG. 5A is selected in the function selection screen 500b illustrated in FIG. 5B. When the user operates the operation unit 104 and changes the selection item from the device-specific mode 504 to charging 505, a function selection screen 500c, illustrated in FIG. 5C, is displayed in the display unit 105. When the user further operates the operation unit 104 while in the function selection screen 500c illustrated in FIG. 5C, and makes a finalizing operation, a settings screen 500d, illustrated in FIG. 5D, is displayed in the display unit 105. In the settings screen 500d illustrated in FIG. 5D, charging 506 is displayed as the setting item 501, after the change to the operating mode, which is started when the external device 150 is connected. At the timing at which the settings screen 500d illustrated in FIG. 5D is displayed, the control unit 101 updates the activate function information recorded in the non-volatile memory 102. When the external device 150 is connected after the activate function information has been updated, the function is activated on the basis of the updated activate function information. When the external device 150 is connected after the settings screen 500d illustrated in FIG. 5D is displayed, the function for charging the battery 110 is activated. Although the third embodiment describes an example of changing the settings from the device-specific mode to charging, the same applies to a case where the settings are changed from charging to the device-specific mode. Furthermore, as described in the first embodiment, if the external device 150 is a legacy device, it is necessary to respond to communication requests. It is thus conceivable to handle this by operating in the device-specific mode even when the activate function information indicates charging. Thus in FIGS. 5B and 5C, the user may be notified by displaying, in the display unit 105, an indication that the operations will not change regardless of the settings when the device is a legacy device. In a settings screen 600 illustrated in FIG. 6, a message 601, which notifies the user that the operations will not change regardless of the settings when the device is a legacy device, is displayed.

Fourth Embodiment

Figure 7:
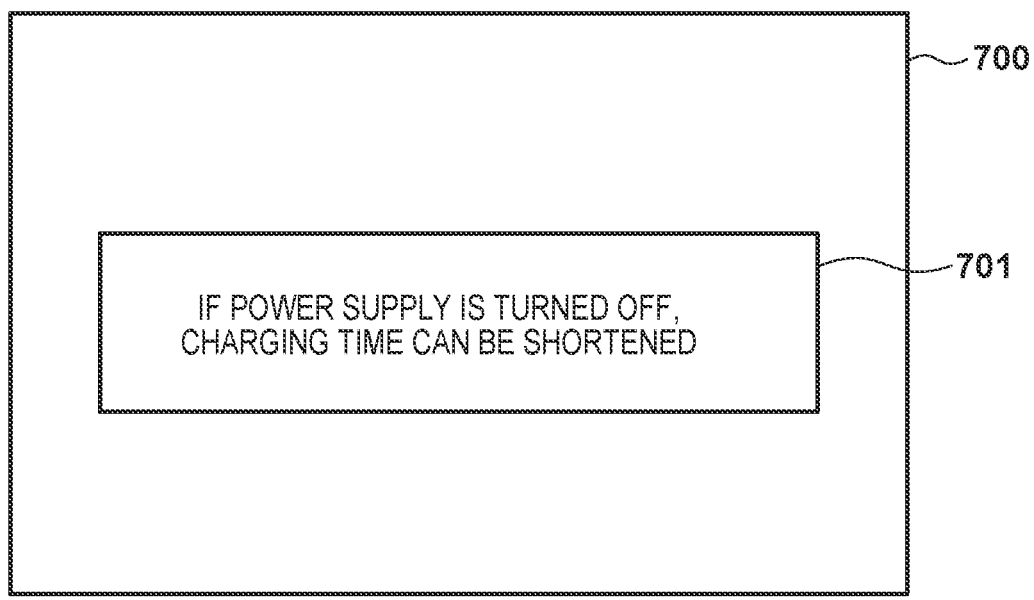
FIG. 7 is a diagram illustrating an example of a screen displayed by the electronic device 100 according to a fourth embodiment.

Even if the process 200 has advanced to step S207 in FIG. 2 and the device is in the device-specific mode, the user may wish to prioritize charging the battery 110 once he or she is finished using the device-specific mode. Thus according to a fourth embodiment, a screen 700 such as that illustrated in FIG. 7 is displayed in the display unit 105, and the user is prompted to transition the process 200 to step S206 in FIG. 2. However, the process of step S206 in FIG. 2 can be executed only when the external device 150 is a Type-C device, and thus the screen in FIG. 7 is not displayed when the external device 150 is a legacy device. It is conceivable to display the screen illustrated in FIG. 7 in the display unit 105 after all the image data specified by the user has been transferred, when the external device 150 is a PC, and after all the image data specified by the user has been printed, when the external device 150 is a printer. The display may also be carried out when the user has not operated the operation unit 104 for a predetermined time period. When, in response to the screen displayed in FIG. 7, the user turns the electronic device 100 off through the operation unit 104, the control unit 101 executes the process of step S206 in FIG. 2, and stops the operations of some or all of the components aside from those necessary for charging the battery 110. Additionally, the execution of the process in step S206 may be an auto shutdown, carried out by the control unit 101 determining various conditions without user operations. The operation unit 104 not being operated for a predetermined amount of time after a function has been executed in the device-specific mode, determining the conditions in an integral manner, or the like are conceivable for the "various conditions" mentioned here.

Note that the components of the electronic device according to the fourth embodiment are the same as in the electronic device 100 according to the first embodiment.

Fifth Embodiment

In the first to fourth embodiments, control may be carried out in accordance with the remaining power in the battery 110, if the remaining battery level can be detected. An electronic device 800 according to a fifth embodiment is configured so that the power remaining in the battery 110 can be detected. In FIG. 8, the electronic device 800 according to the fifth embodiment includes a remaining battery level detection unit 801 that calculates the remaining battery level by measuring a voltage value in the battery 110 or the like and communicates the remaining battery level to the control unit 101. The other components are the same as in FIG. 1, and will thus be given the same reference signs as in FIG. 1, with descriptions being omitted.

Figure 9A:
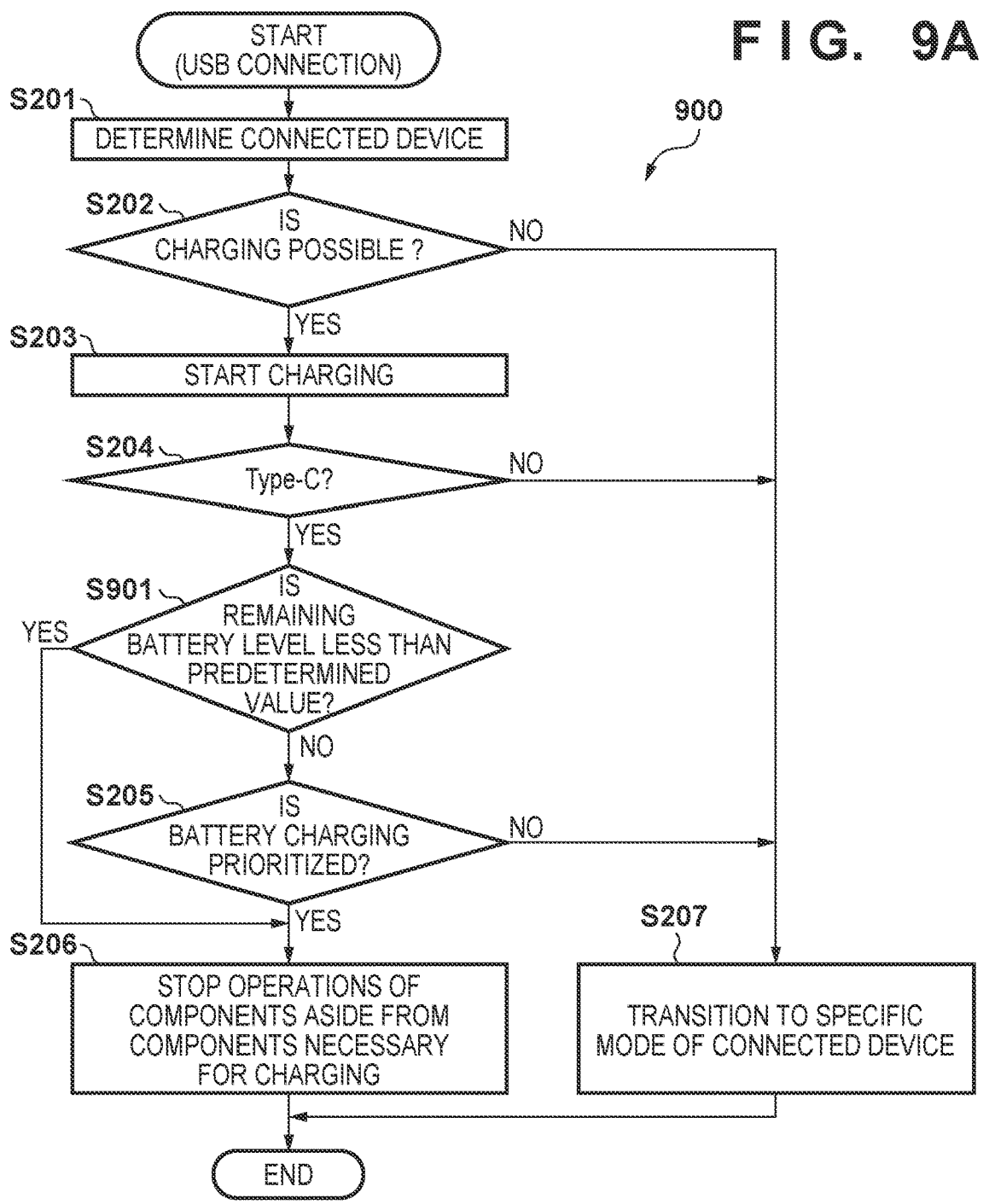
FIG. 9A is a flowchart illustrating an example of operations by the electronic device 800 according to the fifth embodiment.

FIG. 9A illustrates an example of a process using the function of the remaining battery level detection unit 801 according to the fifth embodiment. The process 900 in FIG. 9A is controlled by the control unit 101 executing a program stored in the non-volatile memory 102. The process 900 is started when the user connects the external device 150 to the connection interface 107. Note that in FIG. 9A, processing steps that are the same as in FIG. 2 are given the same step numbers, and will not be described further.

Figure 9B:
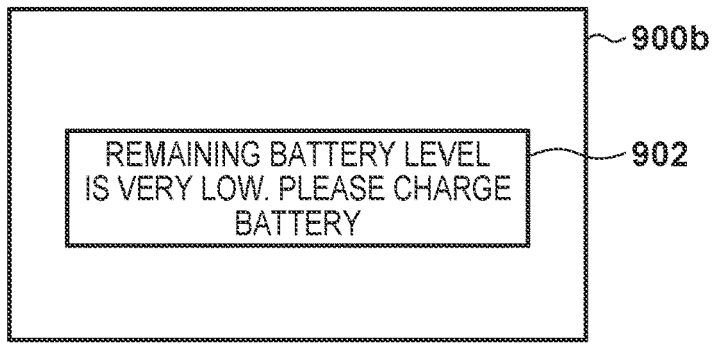
FIG. 9B is a diagram illustrating an example of a screen displayed by the electronic device 800 according to the fifth embodiment.

If in step S204 of FIG. 9A the external device 150 is determined to be a Type-C device (YES in step S204), the process 900 advances to step S901. In step S901, the remaining battery level detection unit 801 detects the remaining power in the battery 110, and notifies the control unit 101. If the notified remaining battery level is less than a predetermined value (YES in step S901), the control unit 101 advances the process 900 to step S206, where power saving control of the electronic device 100 is prioritized. Here, the user may be notified before step S206 is executed, by displaying a screen 900b, such as that illustrated in FIG. 9B, in the display unit 105, and displaying a message 902 indicating that the remaining battery level is low and charging of the battery is required, for example. If a determination of "NO" has been made in step S901, the process advances to step S205, where the same process as in FIG. 2, described in the first embodiment, is executed thereafter.

Sixth Embodiment

A sixth embodiment discloses an image capture device 1000 such as a digital camera, and control is carried out in accordance with camera functions specific to the image capture device 1000.

Figure 10:
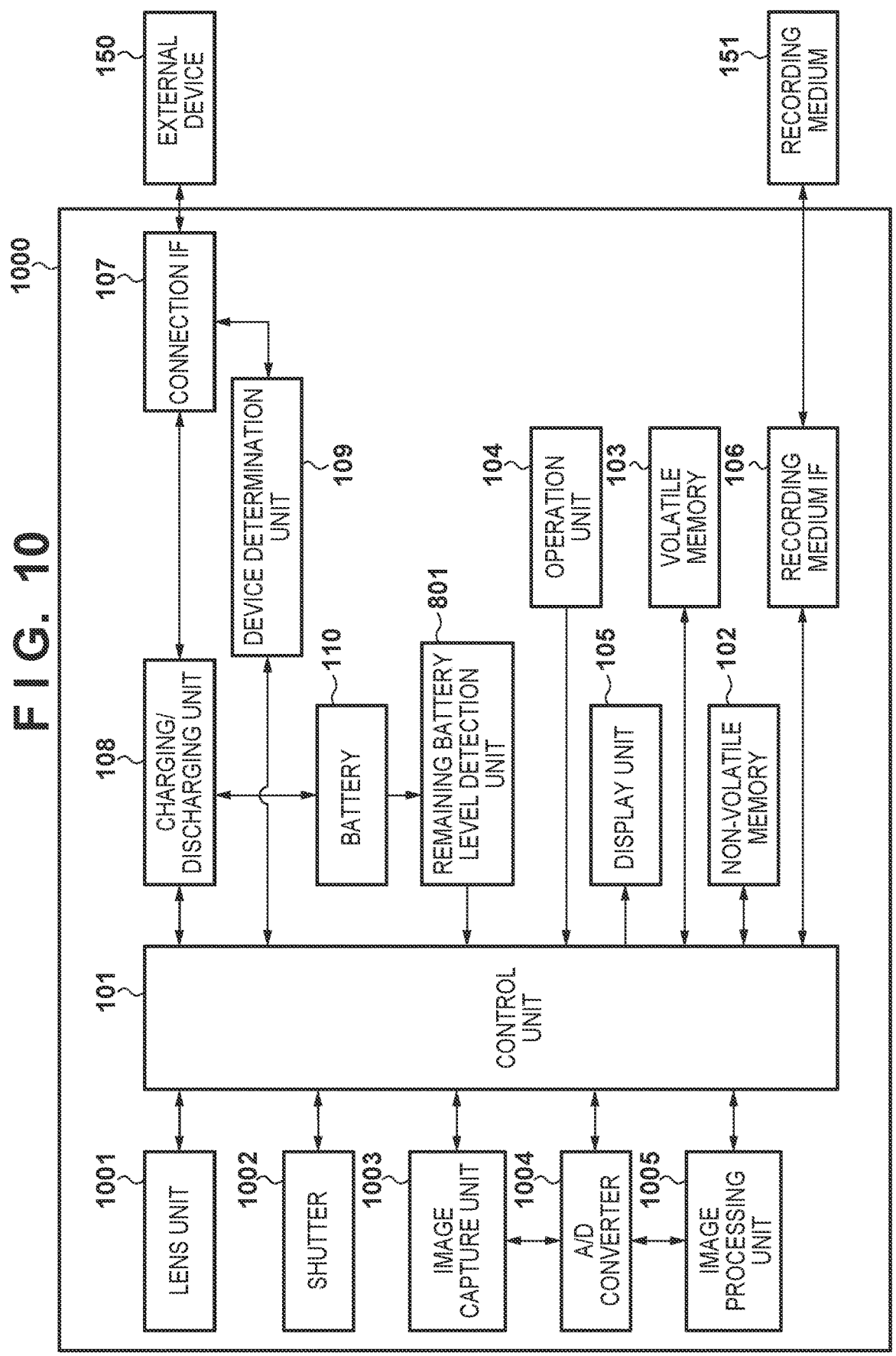
FIG. 10 is a block diagram illustrating an example of components of an image capture device 1000 according to a sixth embodiment.

FIG. 10 illustrates the components of the image capture device 1000 according to the sixth embodiment. The image capture device 1000 according to the sixth embodiment includes a lens unit 1001, a shutter 1002, an image capture unit 1003, an A/D converter 1004, and an image processing unit 1005, in addition to the configuration illustrated in FIG. 8 and described in the fifth embodiment. The lens unit 1001 includes a zoom lens and a focus lens. The shutter 1002 is a shutter having an aperture function. The image capture unit 1003 is an image sensor constituted by a CCD, a CMOS element, or the like that converts an optical image into an electrical signal. The A/D converter 1004 converts analog signals into digital signals. The A/D converter 1004 is used to convert analog signals output from the image capture unit 1003 into digital signals.

The image processing unit 1005 carries out a predetermined pixel interpolation, a resizing process such as reduction, a color conversion process, or the like on data from the A/D converter 1004. The image processing unit 1005 also performs a predetermined arithmetic process using captured image data, and the control unit 101 performs exposure control and focus measurement control based on results obtained from these arithmetic process. A TTL (through-the-lens) AF (autofocus) process, an AE (automatic exposure) process, and an EF (flash pre-emission) process are realized as a result. The image processing unit 1005 also performs a predetermined arithmetic process using the captured image data, performing a TTL AWB (auto white balance) process on the basis of the results thereof.

The output data from the A/D converter 1004 is written directly into the volatile memory 103 through the image processing unit 1005 and the control unit 101. The volatile memory 103 is used as buffer memory for temporarily holding image data obtained by the image capture unit 1003 and converted into digital data by the A/D converter 1004. The volatile memory 103 has a storage capacity sufficient to store a predetermined number of still images, a predetermined time's worth of moving images and audio, and so on.

The volatile memory 103 is also used as image display memory (video memory) for the display unit 105. The control unit 101 also functions as a D/A converter, and converts the image display data held in the volatile memory 103 into an analog signal, which is then supplied to the display unit 105. Image data for display written into the volatile memory 103 is thus displayed by the display unit 105 via the control unit 101 in this manner. The display unit 105 carries out a display in accordance with the analog signal from the control unit 101. The digital signals A/D converted by the A/D converter 1004 and stored in the volatile memory 103 are converted into analog signals by the control unit 101, and those signals are then sequentially transferred and displayed in the display unit 105. This realizes an electronic viewfinder function and makes it possible to carry out a live view display.

The operation unit 104 includes a mode dial that enables the operating mode of the control unit 101 to be switched to one of a still image shooting mode, a moving image shooting mode, a playback mode, or the like, as well as a shutter button that generates a trigger signal for capturing an image.

The other components are the same as in FIGS. 1 and 8, and will thus be given the same reference signs as in FIGS. 1 and 8, with descriptions being omitted.

Figure 11:
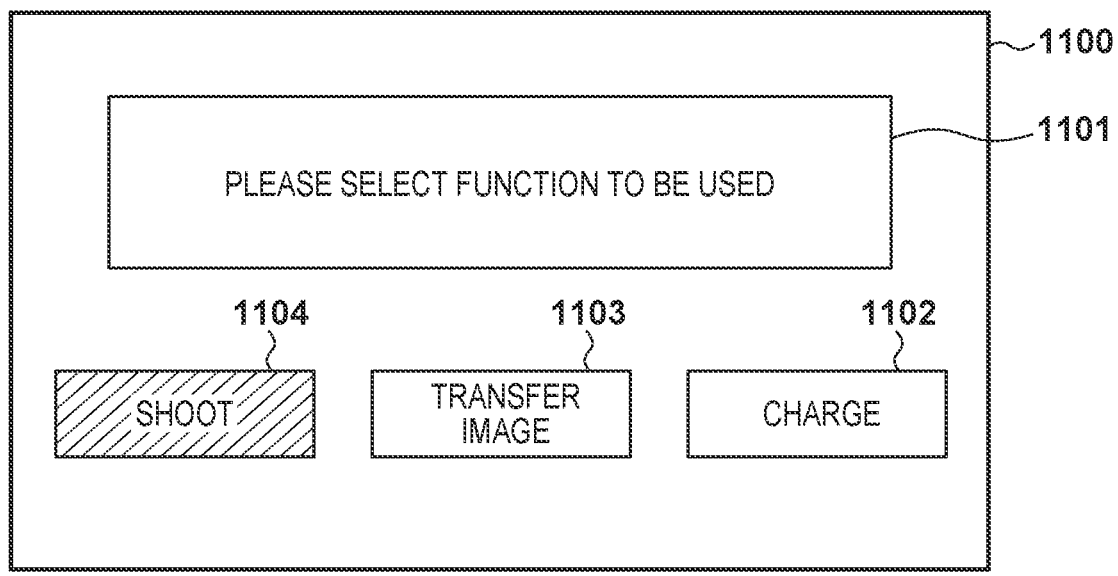
FIG. 11 is a diagram illustrating an example of a screen displayed by the image capture device 1000 according to the sixth embodiment.

When the operating mode is the still image shooting mode or the moving image shooting mode, for example, a screen 1100 such as that illustrated in FIG. 11 may be displayed in the display unit 105 in step S205 of FIG. 2 or 9A to increase the number of functions the user can select. When the user operates the operation unit 104 and selects a selection item 1104 in the screen 1100 illustrated in FIG. 11, the still image shooting mode or the moving image shooting mode is continued. Note that the user selecting selection item 1102 or 1103 corresponds to the case where the user selects the selection item 302 or 303 in the screen 300a illustrated in FIG. 3A, and this will therefore not be described.

Note also that FIG. 11 is an example of a display screen for the case where the external device 150 is a PC. When the external device 150 is a printer, the selection item 1103 is changed to an item pertaining to printing.

Seventh Embodiment

The first to sixth embodiments describe cases where the external device 150 is a USB device as examples. However, the device is not limited to a USB device, as long as the connection interface 107 has the same configuration. Additionally, although the first to sixth embodiments describe examples in which the external device 150 is a PC, a printer, or a USB charger, the type of the external device 150 is not limited thereto. The first to sixth embodiments can therefore be applied even when another type of external device 150 is connected.

Furthermore, the method for determining between the legacy device and the Type-C device is not limited in the first to sixth embodiments. Although the first to sixth embodiments describe a method of determining the device on the basis of the order in which voltages are applied to the VBUS terminal and the CC terminal, the device may be determined using a different method instead.

Eighth Embodiment

Various kinds of functions, processes, or methods described in the first to seventh embodiments can also be realized by a personal computer, a microcomputer, a CPU (Central Processing Unit), or the like with a program. In an eighth embodiment, a personal computer, a microcomputer, a CPU (Central Processing Unit), or the like will be called a "computer X" below. Also, in the eighth embodiment, a program for controlling the computer X and realizing various kinds of functions, processes, or methods described in the first to seventh embodiments will be called a "program Y".

Various kinds of functions, processes, or methods described in the first to seventh embodiments are realized by the computer X executing the program Y. In this case, the program Y is supplied to the computer X via a computer-readable storage medium. The computer-readable storage medium according to the eighth embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the eighth embodiment is a non-transitory storage medium.

Note that embodiments of the disclosure are not limited to the first to eighth embodiments described above. Changes or revisions made to the first, second, third, fourth, fifth, sixth, seventh, or eighth embodiment within a scope of the disclosure are included in embodiments of the disclosure.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2018-190311, filed Oct. 5, 2018, which is hereby incorporated by reference herein in its entirety.

What is claimed is:

1. An electronic device comprising:
   an interface unit that receives power from an external device;
   a charging unit that charges a battery with power received from the external device via the interface unit; and
   a control unit that allows a user to select a charging function or a non-charging function, and stops operations of units excluding the interface unit and the charging unit, in a case where the charging function is selected while the charging unit is charging the battery with the power received from the external device via the interface unit.

2. The electronic device according to claim 1, further comprising a detection unit that detects a remaining battery level of the battery,
   wherein the control unit stops operations of units excluding the interface unit and the charging unit before allowing a user to select the charging function or the non-charging function, in a case where the charging unit charges the battery with the power received from the external device via the interface unit and the remaining battery level of the battery is less than a predetermined value.

3. The electronic device according to claim 1, wherein the interface unit is compliant with Universal Serial Bus (USB) Type-C standard.

4. The electronic device according to claim 1, further comprising an image capture unit that captures an image.

5. The electronic device according to claim 1, wherein the electronic device is capable of acting as a digital camera.

6. The electronic device according to claim 1, wherein the electronic device is capable of acting as a smartphone.

7. The electronic device according to claim 1, wherein the electronic device is capable of acting as a mobile device.

8. A method comprising:
causing an interface unit of an electronic device to receive power from an external device;
causing a charging unit of the electronic device to charge a battery with power received from the external device via the interface unit;
allowing a user to select a charging function or a non-charging function; and
stopping operations of units excluding the interface unit and the charging unit, in a case where the charging function is selected while the charging unit is charging the battery with the power received from the external device via the interface unit.

9. The method according to claim 8, further comprising:
detecting a remaining battery level of the battery; and
stopping operations of units excluding the interface unit and the charging unit before allowing a user to select the charging function or the non-charging function, in a case where the charging unit charges the battery with the power received from the external device via the interface unit and the remaining battery level of the battery is less than a predetermined value.

10. The method according to claim 8, wherein the interface unit is compliant with Universal Serial Bus (USB) Type-C standard.

11. The method according to claim 8, wherein the electronic device includes an image capture unit that captures an image.

12. The method according to claim 8, wherein the electronic device is capable of acting as a digital camera.

13. The method according to claim 8, wherein the electronic device is capable of acting as a smartphone.

14. The method according to claim 8, wherein the electronic device is capable of acting as a mobile device.

15. A non-transitory storage medium that stores a program causing a computer to execute a method, the method comprising:
causing an interface unit of an electronic device to receive power from an external device;
causing a charging unit of the electronic device to charge a battery with power received from the external device via the interface unit;
allowing a user to select a charging function or a non-charging function; and
stopping operations of units excluding the interface unit and the charging unit, in a case where the charging function is selected while the charging unit is charging the battery with the power received from the external device via the interface unit.

\* \* \* \* \*